(12) United States Patent
Pal (10) Patent No.: US 10,778,056 B2
(45) Date of Patent: Sep. 15, 2020

(54) GENERATOR WITH ENHANCED STATOR COOLING AND REDUCED WINDAGE LOSS (71) Applicant: Hamilton Sundstrand Corporation, Charlotte, NC (US)

(72) Inventor: Debabrata Pal, Hoffman Estates, IL (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 282 days.

(21) Appl. No.: 15/596,259

(22) Filed: May 16, 2017

(65) Prior Publication Data
US 2018/0337571 A1 Nov. 22, 2018

(51) Int. Cl.
H02K 9/19 (2006.01)
H02K 1/32 (2006.01)
H02K 1/28 (2006.01)
H02K 1/22 (2006.01)
H02K 9/22 (2006.01)
H02K 5/20 (2006.01)
H02K 9/197 (2006.01)
H02K 1/20 (2006.01)

(52) U.S. Cl.
CPC .............. H02K 1/32 (2013.01); H02K 1/20 (2013.01); H02K 1/22 (2013.01); H02K 1/28 (2013.01); H02K 5/20 (2013.01); H02K 9/197 (2013.01); H02K 9/22 (2013.01)

(58) Field of Classification Search
CPC .. H02K 1/06; H02K 1/12; H02K 1/20; H02K 1/22; H02K 1/28; H02K 1/32; H02K 9/00; H02K 9/02; H02K 9/06; H02K 9/08; H02K 9/10; H02K 9/16; H02K 9/22
See application file for complete search history.

(56) References Cited

U.S. PATENT DOCUMENTS

| | | | |
|---|---|---|---|
| 1,959,527 A * | 5/1934 | Ehrmann | H02K 1/20 310/54 |
| 2,285,960 A | 6/1942 | Fechheimer | |
| 2,381,122 A * | 8/1945 | Fechheimer | H02K 9/197 310/61 |
| 2,975,309 A * | 3/1961 | Seidner | H02K 9/197 310/54 |
| 5,363,002 A | 11/1994 | Hernden et al. | |
| 7,476,994 B2 | 1/2009 | Birdi et al. | |
| 8,427,018 B2 | 4/2013 | Dutau et al. | |
| 8,456,048 B2 | 6/2013 | Lokhandwalla et al. | |

(Continued)

FOREIGN PATENT DOCUMENTS

EP 1205019 A1 5/2002

OTHER PUBLICATIONS

Extended European Search Report; European Application No. 18172730.6; dated Aug. 21, 2018; 9 Pages.

Primary Examiner — Tran N Nguyen
(74) Attorney, Agent, or Firm — Cantor Colburn LLP (57) ABSTRACT A stator of an electrical generator includes a stator core including a plurality of stacked stator laminations and at least one end turn. At least one cooling passage provides a fluid flow path through a portion of the plurality of stator laminations to the at least one end turn. The at least one cooling passage includes at least one radial channel arranged in fluid communication with an axial channel. The at least one cooling passage is formed directly into the portion of the plurality of stator laminations.

15 Claims, 5 Drawing Sheets (56) References Cited

U.S. PATENT DOCUMENTS

| | | |
|---|---|---|
| 8,922,072 B2 | 12/2014 | Bott et al. |
| 2002/0180284 A1* | 12/2002 | LeFlem .................... H02K 3/24 |
| | | 310/54 |
| 2012/0242176 A1 | 9/2012 | Pal |
| 2014/0346778 A1 | 11/2014 | Arlaban et al. |
| 2015/0076951 A1 | 3/2015 | Lynch et al. |
| 2016/0087509 A1 | 3/2016 | Rippel et al. |

* cited by examiner

GENERATOR WITH ENHANCED STATOR COOLING AND REDUCED WINDAGE LOSS

BACKGROUND

Exemplary embodiments disclosed herein relate to a cooling arrangement for a high power electric machine, such as a generator used in aerospace applications.

Aircraft powered by gas turbine engines often include a mechanically driven accessory gearbox which connects to accessory systems such as an electrical starter-generator or electric generator. High power density aircraft generators utilize an internal oil management system. The internal oil management system provides supplemental cooling to the generator main stator through a back iron oil flow. The back iron oil flow is additionally used to cool the stator end turns. However, the flow provided thereto is not controlled and the oil ultimately floods the rotor-stator air gap. The wet cavity creates by this flooding causing significant windage loss, which in turn reduces the operational efficiency of the machine.

BRIEF DESCRIPTION

According to an embodiment, a stator of an electrical generator includes a stator core including a plurality of stacked stator laminations and at least one end turn. At least one cooling passage provides a fluid flow path through a portion of the plurality of stator laminations to the at least one end turn. The at least one cooling passage includes at least one radial channel arranged in fluid communication with an axial channel. The at least one cooling passage is formed directly into the portion of the plurality of stator laminations.

In addition to one or more of the features described above, or as an alternative, in further embodiments the portion of the plurality of stator laminations includes a plurality of adjacent stator laminations.

In addition to one or more of the features described above, or as an alternative, in further embodiments each of the plurality of adjacent stator laminations includes a through hole, the through holes being aligned to define the axial channel.

In addition to one or more of the features described above, or as an alternative, in further embodiments the at least one cooling passage includes a plurality of cooling passages, the plurality of cooling passages being formed at various circumferential positions about the stator core.

In addition to one or more of the features described above, or as an alternative, in further embodiments the at least one radial channel is arranged adjacent an interior end of the axial channel.

In addition to one or more of the features described above, or as an alternative, in further embodiments the at least one radial channel includes a plurality of radial channels, the plurality of radial channels being spaced at intervals over a length of the axial channel.

In addition to one or more of the features described above, or as an alternative, in further embodiments the at least one radial channel comprises an opening formed in one or more of the portion of the plurality of stator laminations, the opening extending from an outer periphery of the stator lamination to the axial channel.

According to another embodiment, an electrical machine includes a housing and a stator arranged within the housing. The stator includes a lamination stack with an end turn extending generally axially from the lamination stack. At least one cooling passage extends through an interior of the lamination stack and has an exit provided near the end turn. The at least one cooling passage includes at least one radial channel arranged in fluid communication with an axial channel. The at least one radial channel generally extends between an outer periphery and an inner periphery of the stator, and the axial channel extends from a central portion to an end of the lamination stack.

In addition to one or more of the features described above, or as an alternative, in further embodiments comprising an end sleeve mounted about an outer periphery of the stator, between the stator and the housing.

In addition to one or more of the features described above, or as an alternative, in further embodiments comprising a main sleeve mounted about an inner periphery of the stator, the main sleeve including flanges connected to the housing to define a cavity within which the stator is positioned.

In addition to one or more of the features described above, or as an alternative, in further embodiments comprising a rotor having a rotational axis, wherein the cavity is fluidly isolated from the rotor.

In addition to one or more of the features described above, or as an alternative, in further embodiments the at least one cooling passage includes a plurality of cooling passages, the plurality of cooling passages being formed at various circumferential positions about the stator core.

In addition to one or more of the features described above, or as an alternative, in further embodiments the axial channel extends through a plurality of adjacent stator laminations within the lamination stack.

In addition to one or more of the features described above, or as an alternative, in further embodiments each of the plurality of adjacent stator laminations includes a through hole, the through holes being aligned to define the axial channel.

In addition to one or more of the features described above, or as an alternative, in further embodiments the at least one radial channel is fluidly coupled to the axial channel adjacent an interior end of the axial channel.

In addition to one or more of the features described above, or as an alternative, in further embodiments the at least one radial channel includes a plurality of radial channels, the plurality of radial channels being spaced at intervals over a length of the axial channel.

In addition to one or more of the features described above, or as an alternative, in further embodiments the at least one radial channel comprises an opening formed in at least one stator lamination within the lamination stack.

In addition to one or more of the features described above, or as an alternative, in further embodiments the opening is formed in a plurality of stator laminations within the lamination stack, the openings being aligned to defined the at least one radial channel.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus are presented herein by way of exemplification and not limitation with reference to the Figures.

Figure 1:
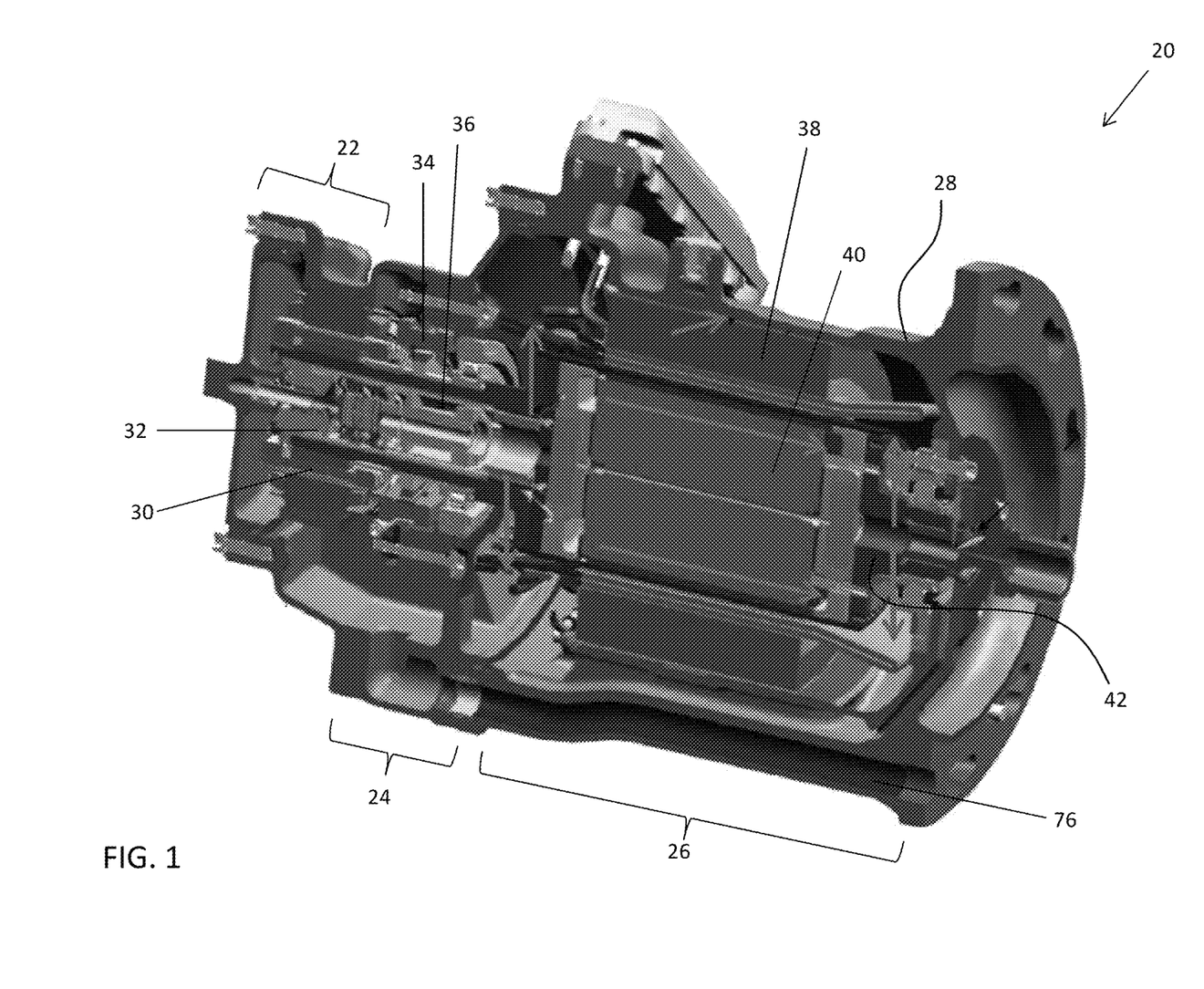
FIG. 1 is a perspective view of a fluid-cooled generator according to an embodiment.
Figure 2:
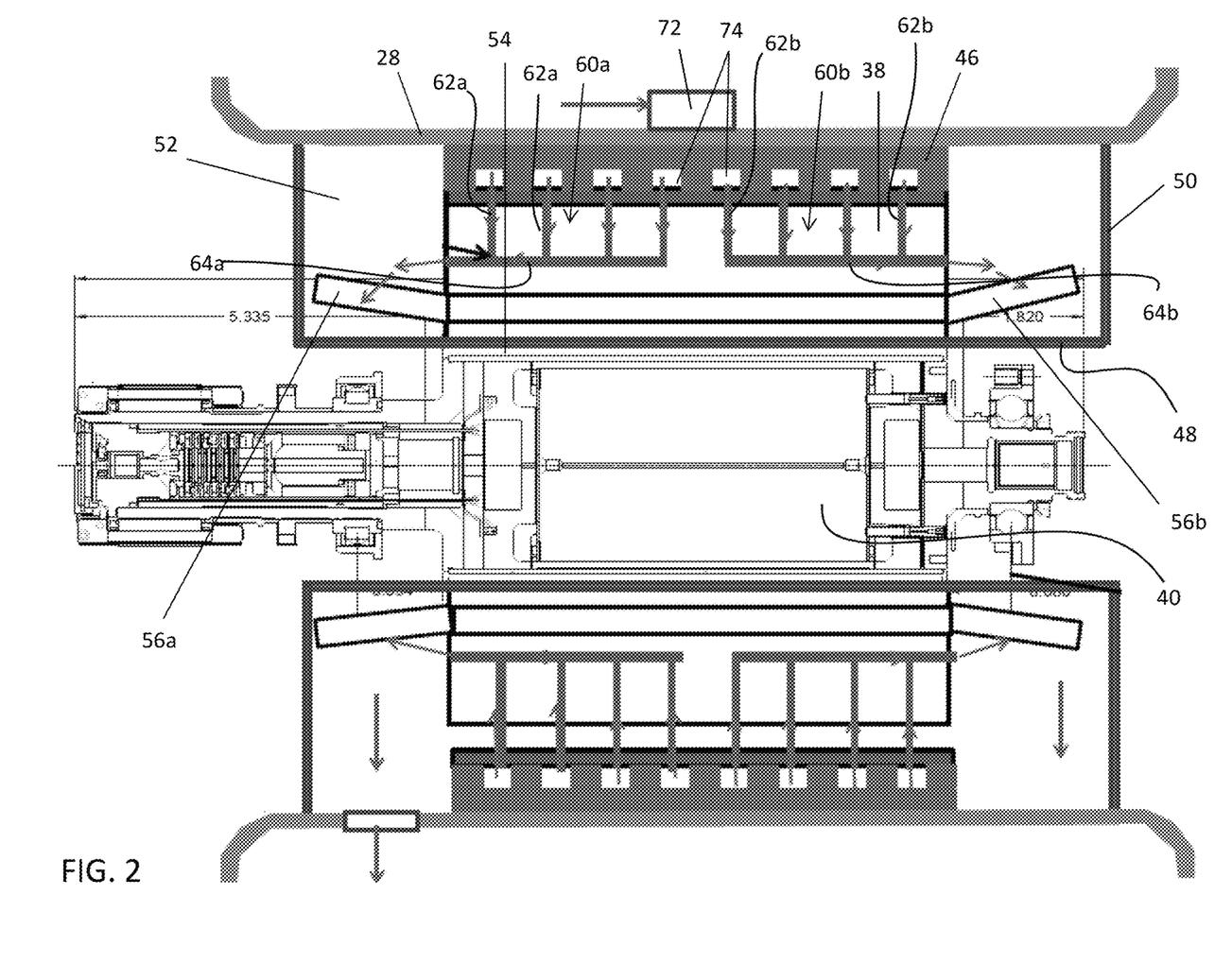
FIG. 2 is a schematic cross-section of a generator section of a generator according to an embodiment.

With reference now to FIG. 1, an example of an oil cooled generator 20 which may be used with a prime mover, such as a gas turbine engine for example, is illustrated. The generator 20 includes exciter, permanent magnet generator (PMG) and generator sections 22, 24, 26. Each of the sections 22, 24, 26 is arranged within a housing 28, which may be provided by multiple housing sections secured to one another to facilitate assembly and maintenance of the generator 20. The exciter section 22 includes an exciter stator 30 and an exciter rotor 32; the PMG section 24 includes a PMG stator 34 and a PMG rotor 36; and the generator section 26 includes a generator stator 38 and a generator rotor 40 mounted on a shaft 42.

The core of the generator stator 38 includes a plurality of substantially identical stator laminations 44 (see FIG. 3) arranged in a stacked configuration. The outer circumference or diameter of the generator stator 38 is arranged within close proximity to an inner diameter of the housing 28. A stator end sleeve 46 may be mounted in overlapping arrangement with the stator 38 such that the end sleeve 46 is located between the housing 28 and the plurality of stator laminations 44. In an embodiment, the stator 38 is press-fit into the stator end sleeve 46 and the stator end sleeve 46 is press-fit into the housing 28. As a result, the stator end sleeve 46 provides an interface between the outer diameter of the stator 38 and the inner diameter of the adjacent housing 28.

Referring now to FIGS. 2-5, in an embodiment, the generator stator 38 additionally includes a stator main sleeve 48 having an outer diameter substantially equal to or just slightly smaller than the inner diameter of the stator 38. Accordingly, the stator main sleeve 48 is in direct contact with the inner diameter of the stator 38. The thickness of the stator main sleeve 48 should be selected to maintain a clearance between the stator main sleeve 48 and the outer diameter of the rotor 40, thereby allowing the rotor 40 to freely rotate about its axis without interference. A flange extends 50 from each end of the stator main sleeve 48 towards the stator 38 and the housing 28. In an embodiment, the stator end sleeve 46 and the stator main sleeve 48 are integrally formed. In combination, the housing 28 and the stator main sleeve 48 define an enclosed space or cavity 52 within which the stator 38 is positioned. The cavity 52 is fluidly isolated from the rotor 40 and the air gap 54 formed between the rotor 40 and the stator 38. As a result, the rotor 40 remains dry and is not contact by the cooling fluid provided to the stator 38.

To enhance cooling of the generator stator 38, one or more cooling passages 60 may be formed in the stator 38. As shown, each of the cooling passages 60 includes a radial channel 62 extending generally perpendicular to the axis of rotation of the rotor 40, and an axial channel 64 extending generally parallel to the axis of rotation of the rotor 40. The axial channel 64 of the at least one cooling passage 60 may extend through all or only a portion of the stacked stator laminations 44 of the stator 38. To maximize the cooling effect achieved by each cooling passage 60, the axial channel 64 of each cooling passage 60 typically extends from a central portion of the stator 38 to an end of the stator 44. In the illustrated, non-limiting embodiment of FIG. 2, the stator 38 includes at least one first cooling passage 60a arranged in fluid communication with a first stator end turn 56a and at least one second cooling passage 60b arranged in fluid communication with a second stator end turn 56b. As shown, the axial channel 64 of at least one first cooling passage 60a extends through a first portion of the stator laminations 44 and the axial channel 64b of at least one second cooling passage 60b extends through a second portion of the stator laminations 44. Although the first portion and the second portion of the stator laminations 44 are illustrated as being distinct, embodiments where the first portion and the second portion overlap or are substantially identical are also contemplated herein.

Figure 4:
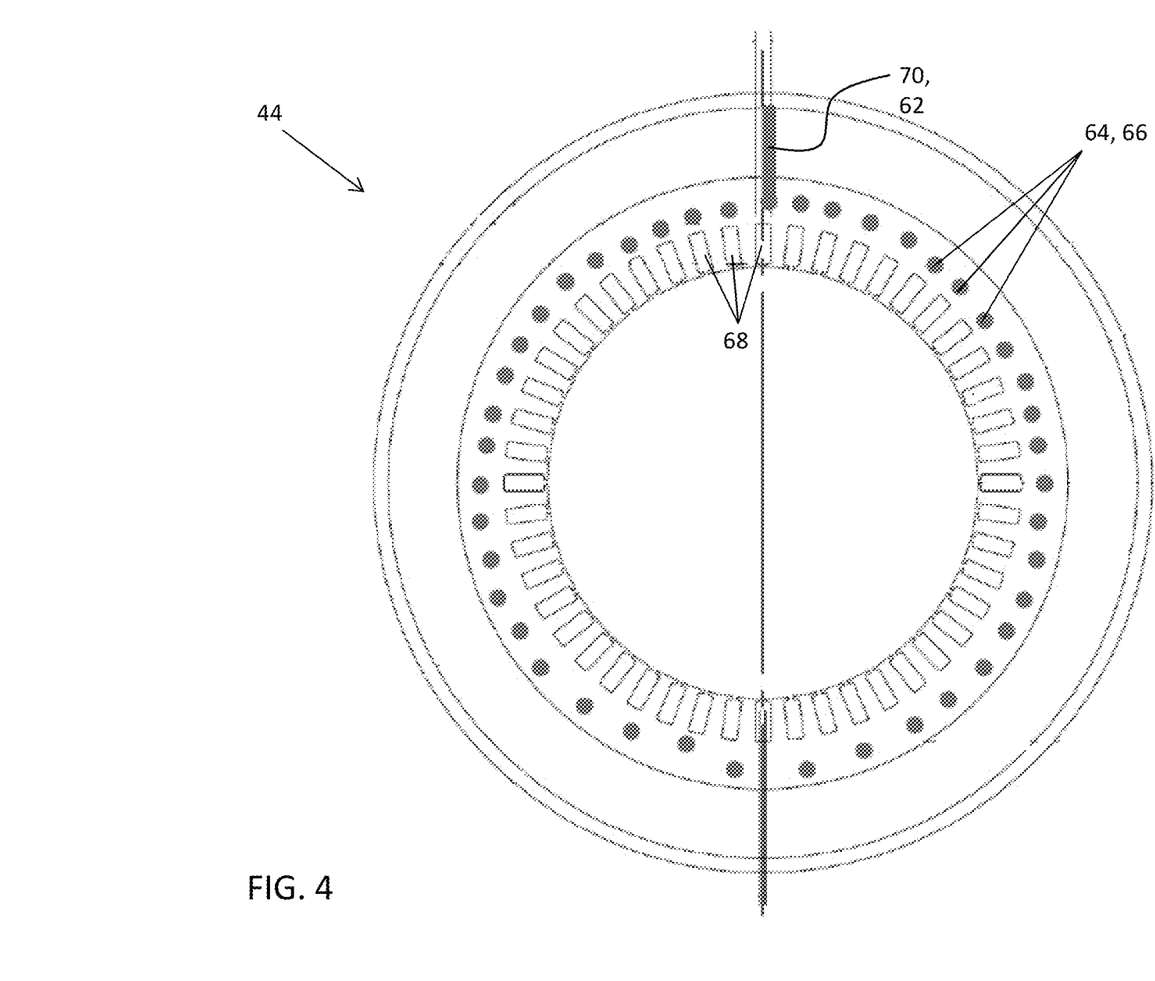
FIG. 4 is a front view of a stator lamination of a generator stator according to an embodiment.
Figure 5:
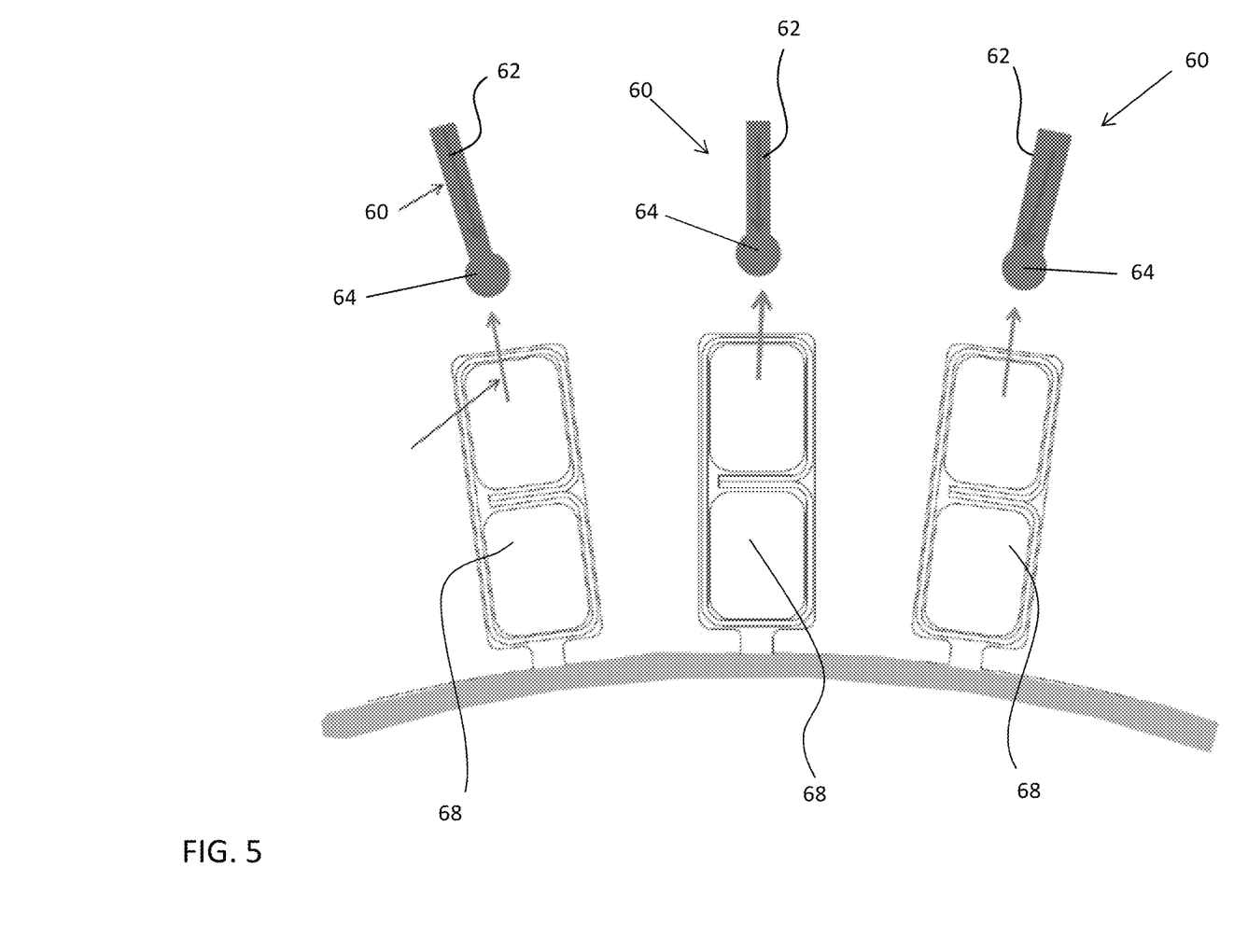
FIG. 5 is a detailed view of a portion of the stator lamination of FIG. 4 according to an embodiment.

With reference to FIG. 4, an example of a stator lamination 44 associated with either the first portion or the second portion is illustrated in more detail. The stator lamination 44 includes one or more through holes 66, each of which forms part of the axial channel 64 of a cooling passage 60. The axial channel 64 of each cooling passage 60 is formed by axially aligning the one or more through holes 66 of adjacent stator laminations 44. In the illustrated, non-limiting embodiment, the stator lamination 44 includes a plurality of through holes 66 spaced equidistantly at a desired distance between the inner diameter and the outer diameter of the stator 38. As best shown in FIG. 5, the plurality of through holes 66 may be positioned generally adjacent to the windings 68 arranged adjacent the inner diameter of the stator laminations 44, to more efficiently remove heat from the windings 68.

Each cooling passage 60 includes at least one radial channel 62 arranged in fluid communication with the axial channel 64. The radial channel 62 may be located at any position over the length of the axial channel 64. However, to maximize the cooling of the stator 38 performed by each cooling passage 60, the radial channel 62 may be arranged adjacent the end of the axial channel 64 disposed within an interior stator lamination 44. In the illustrated, non-limiting embodiment of FIG. 2, at least one of the cooling passages 60 has a plurality of radial channels 62 connected thereto. In such embodiments, the plurality of radial channels 62 may be arranged at intervals over the length of the axial channel 64, such as every 20-40 laminations 44 for example. However, embodiments where the cooling passage 60 includes only a single radial channel 62 associated with a corresponding axial channel 64 are also contemplated herein.

Figure 3:
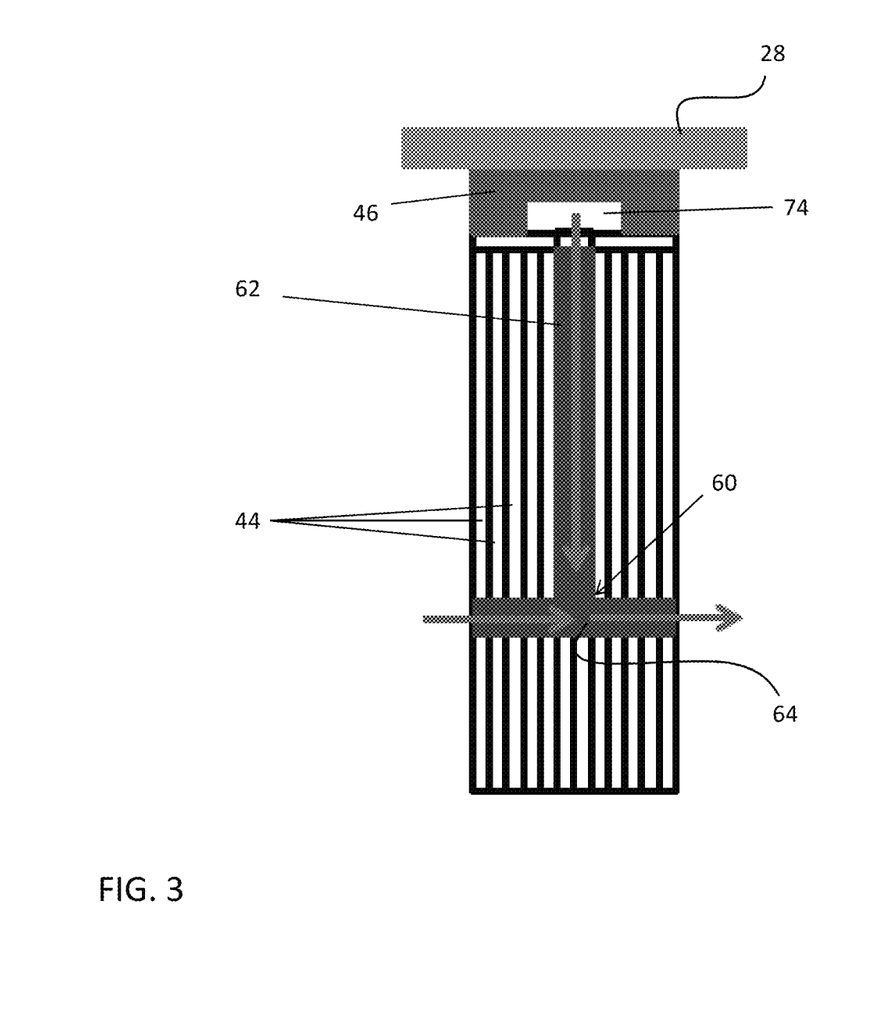
FIG. 3 is a detailed view of a portion of the cross-section of FIG. 2 according to an embodiment.

As best shown in FIG. 4, the at least one radial channel 62 of each cooling passage 60 is defined by an opening 70 extending from an outer periphery of a stator lamination 44 to a corresponding through hole 66 of the stator lamination 44. In an embodiment, the opening 70 is formed via a machining or punching operation. In an embodiment, as best shown in 3, the radial channel 62 may be defined by a plurality of such openings 70 formed in two or more adjacent and aligned stator laminations 44 to achieve a desired cross-sectional area.

Although the stator lamination illustrated in FIG. 4, includes a single opening 70, it should be understood that each stator lamination 44 may have any number of openings 70 formed therein. Accordingly, in some embodiments, a plurality of openings 70, each of which is associated with a corresponding through hole 66, may be formed in a single stator lamination 44.

The radial channels 62 associated with adjacent axial channels 64 may be formed in the same stator laminations 44, and therefore be located at the same axial position of the stator 38. Alternatively, the radial channels 62 associated with adjacent axial channels 64 may be formed in different stator laminations 44, such that the radial channels 62 are axially offset from one another about the periphery of the stator 38. In addition, it should therefore be understood that in some embodiments, one or more of the stator laminations 44 may have no openings 70 configured to define a radial channel 62 associated with one of the through holes 66 formed therein.

In operation, a cooling fluid is provided to an inlet 72 (see FIG. 2) formed in the housing 28. From the inlet 72, the cooling fluid is communicated through a plurality of openings 74 formed in the end sleeve 46 to the radial channels 62. From the radial channels 62, the cooling fluid passes to the axial channels 64 where the cooling fluid moves from an interior or central portion of the stator 38 to an end of the stator 38. The distal ends of the axial channels 64 are arranged in fluid communication with the cavity 52 such that the cooling fluid is expelled therefrom over one of the stator end turns 56a, 56b. From within the cavity 52, the cooling fluid is communicated to a cooling fluid conduit via one or more outlets 76 (FIG. 1) formed in the housing 28. In an embodiment, a pump may be operably coupled to the conduit 76 to move the cooling fluid at least partially through the generator 20.

The generator 20 described herein has simplified and enhances oil cooled stator cooling due to inclusion of the cooling passages 60 integrally formed with the core. Further, by enclosing the stator 38 within the cavity 52 between the stator main sleeve 48 and the housing 28, the cooling oil is prevented from entering the rotor stator gap, thereby reducing the windage losses and increasing the efficiency of the machine.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope hereof.

What is claimed is:

1. A stator of an electrical generator, comprising:
   a housing;
   a cavity formed within the housing, the cavity being fluidly isolated from an interior of the housing;
   a stator core including an end sleeve, a plurality of stacked stator laminations and at least one end turn, the stator core being arranged within the cavity;
   a main sleeve mounted about an inner periphery of the stator, the main sleeve including flanges connected to the housing to define the cavity within which the stator core is positioned, the cavity being isolated form a remainder of the electrical generator;
   at least one cooling passage providing a fluid flow path extending from the end sleeve, through a portion of the plurality of stator laminations arranged at the center of the stator core to the at least one end turn arranged at an end of the stator core, the at least one cooling passage including at least one radial channel and an axial channel, wherein the at least one radial channel is configured to receive a fluid from the end sleeve and deliver the fluid to the axial channel, wherein the at least one cooling passage is formed directly into the portion of the plurality of stator laminations and an inlet of the at least one cooling passage is formed in the housing.

2. The stator of claim 1, wherein the portion of the plurality of stator laminations includes a plurality of adjacent stator laminations.

3. The stator of claim 2, wherein each of the plurality of adjacent stator laminations includes a through hole, the through holes being aligned to define the axial channel.

4. The stator of claim 2, wherein the at least one cooling passage includes a plurality of cooling passages, the plurality of cooling passages being formed at various circumferential positions about the stator core.

5. The stator of claim 1, wherein the at least one radial channel is arranged adjacent an end of the axial channel, the end of the axial channel being disposed within an interior stator lamination of said plurality of stacked stator laminations.

6. The stator of claim 1, wherein the at least one radial channel includes a plurality of radial channels, the plurality of radial channels being spaced at intervals over a length of the axial channel.

7. The stator of claim 1, wherein the at least one radial channel comprises an opening formed in at least one stator lamination of the plurality of stator laminations, the opening extending from an outer periphery of at least one the stator lamination to the axial channel.

8. An electrical machine comprising:
   a housing;
   a rotor arranged within the housing, the rotor being rotatable about a rotational axis;
   a cavity formed within the housing, the cavity being fluidly isolated from the rotor;
   a stator arranged within the housing and including a lamination stack with an end turn extending generally axially from the lamination stack;
   an end sleeve mounted about an outer periphery of the stator, between the stator and the housing;
   a main sleeve mounted about an inner periphery of the stator, the main sleeve including flanges connected to the housing to define the cavity within which the stator is positioned, the cavity being isolated from the rotor and an air gap formed between the rotor and the stator,
   at least one cooling passage providing a fluid flow path extending from the end sleeve, through an interior of the lamination stack arranged at a center of the stator and having an exit provided near the end turn arranged at a side of the stator, the at least one cooling passage including at least one radial channel arranged in fluid communication with an axial channel, the at least one radial channel generally extending between an outer periphery and an inner periphery of the stator, the at least one radial channel is configured to receive a fluid from the end sleeve and deliver the fluid to the axial channel extending from a central portion to an end of the lamination stack, wherein an inlet of the at least one cooling passage is formed in the housing adjacent the lamination stack.

9. The electrical machine of claim 8, wherein the at least one cooling passage includes a plurality of cooling passages, the plurality of cooling passages being formed at various circumferential positions about the stator core.

10. The electrical machine of claim 8, wherein the axial channel extends through a plurality of adjacent stator laminations within the lamination stack.

11. The electrical machine of claim 10, wherein each of the plurality of adjacent stator laminations includes a through hole, the through holes being aligned to define the axial channel.

12. The electrical machine of claim 8, wherein the at least one radial channel is fluidly coupled to the axial channel adjacent an end of the axial channel, the end of the axial channel being disposed within an interior stator lamination of said plurality of stacked stator laminations.

13. The electrical machine of claim 8, wherein the at least one radial channel includes a plurality of radial channels, the plurality of radial channels being spaced at intervals over a length of the axial channel.

14. The electrical machine of claim 8, wherein the at least one radial channel comprises an opening formed in at least one stator lamination within the lamination stack.

15. The electrical machine of claim 14, wherein the opening is formed in a portion of the plurality of stator laminations within the lamination stack, the portion of the plurality of stator laminations being aligned to defined the at least one radial channel.

* * * * *